(12) United States Patent
Gurav

(10) Patent No.: US 9,823,923 B2
(45) Date of Patent: Nov. 21, 2017

(54) CONTROL FLOW POINTS BASED SOFTWARE SIZE AND EFFORT ESTIMATION

(71) Applicant: Accenture Global Solutions Limited, Dublin (IE)

(72) Inventor: Vijay Ashok Gurav, Belgaum (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/084,127

(22) Filed: Mar. 29, 2016

(65) Prior Publication Data
US 2017/0286105 A1 Oct. 5, 2017

(51) Int. Cl.
G06F 9/44 (2006.01)
G06F 11/36 (2006.01)
G06F 17/30 (2006.01)

(52) U.S. Cl.
CPC ........... *G06F 8/77* (2013.01); *G06F 11/3608* (2013.01); *G06F 17/30339* (2013.01)

(58) Field of Classification Search
USPC ............................. 717/101–108, 120–123
IPC ........................................................ G06F 8/77
See application file for complete search history.

(56) References Cited

U.S. PATENT DOCUMENTS

| | | | | |
|---|---|---|---|---|
| 6,442,748 B1 * | 8/2002 | Bowman-Amuah | ..... | G06F 8/20 707/999.009 |
| 6,550,057 B1 * | 4/2003 | Bowman-Amuah | ... | G06F 17/30 700/80 |
| 6,662,357 B1 * | 12/2003 | Bowman-Amuah | ..... | G06F 8/20 717/120 |
| 6,718,535 B1 * | 4/2004 | Underwood | .......... | G06F 9/4443 717/101 |
| 6,865,429 B1 * | 3/2005 | Schneider | ................ | G06F 8/10 700/86 |
| 7,139,999 B2 * | 11/2006 | Bowman-Amuah | .. | G06Q 10/06 717/100 |
| 7,603,653 B2 * | 10/2009 | Sundararajan | ............ | G06F 8/10 715/730 |

(Continued)

OTHER PUBLICATIONS

Palomares et al, "A Catalogue of Functional Software Requirement Patterns for the Domain of Content Management Systems", ACM, pp. 1260-1265, 2013.*

(Continued)

*Primary Examiner* — Anil Khatri
(74) *Attorney, Agent, or Firm* — Fish & Richardson P.C.

(57) ABSTRACT

Methods, systems, and apparatus, including computer programs encoded on a computer storage medium, for size and effort estimation of software-based projects. The software-based project includes functional requirements and computer-implemented programing language code. The method includes that for each functional requirement, identifying one or more controls flows associated with the functional requirement, each control flow including one or more components; accessing one or more reference tables; determining, for each component of the one or more components, a complexity of the component based on a comparison with the one or more reference tables; and estimating an effort of the software-based project based on the complexity of each component of the one or more control flows associated with the one or more functional requirements.

19 Claims, 10 Drawing Sheets

(56) References Cited

U.S. PATENT DOCUMENTS

| | | | |
|---|---|---|---|
| 7,743,369 B1 | 6/2010 | Colussi et al. | |
| 7,778,866 B2* | 8/2010 | Hughes | G06F 8/20 |
| | | | 705/7.42 |
| 7,788,632 B2* | 8/2010 | Kuester | G06F 11/3672 |
| | | | 717/100 |
| 7,840,944 B2* | 11/2010 | Brunswig | G06F 11/3688 |
| | | | 714/38.1 |
| 7,870,535 B2* | 1/2011 | Rippert, Jr. | G06F 8/20 |
| | | | 717/100 |
| 8,006,223 B2* | 8/2011 | Boulineau | G06F 8/20 |
| | | | 705/7.22 |
| 8,146,058 B2* | 3/2012 | Sarkar | G06F 8/10 |
| | | | 717/101 |
| 8,397,208 B2* | 3/2013 | Brown | G06F 8/24 |
| | | | 717/101 |
| 8,434,069 B2 | 4/2013 | Chandra | |
| 8,660,878 B2* | 2/2014 | Bernardini | G06Q 10/06311 |
| | | | 700/105 |
| 8,661,404 B2* | 2/2014 | Goel | G06F 8/20 |
| | | | 717/101 |
| 8,793,203 B2 | 7/2014 | de Mello Filho | |
| 2007/0174702 A1 | 7/2007 | Meyer | |
| 2009/0319317 A1 | 12/2009 | Colussi et al. | |

OTHER PUBLICATIONS

Palomares et al, "A Catalogue of Functional Software Requirement Patterns for the Domain of Content Management Systems" ACM, pp. 1260-1265, 2013.*

French et al, "Putting Non-Functional Requirements into Software Architecture", IEEE, pp. 1-8, 1998.*

Kaiya et al, "Toward Quality Requirements Analysis based on Domain Specific Quality Spectrum" ACM, pp. 596-601, 2008.*

Affleck et al, "Supporting Quantitative Reasoning of Non-functional Requirements: A Process-Oriented Approach", IEEE, pp. 88-92, 2012.*

\* cited by examiner

402

| ET Complexity | ET Type |
|---|---|
| Simple | Program batch interface |
| Medium | Asynchronous Messaging real time or protocol-driven hand shake interface, Web service |
| Complex | GUI interface |

404

| CF Complexity | Complexity based on Rules/Validations |
|---|---|
| Simple | <=2 |
| Medium | 3-7 |
| Complex | >=8 |

406

| EI/DO Complexity | EI/DO Type |
|---|---|
| Simple | Calling internal/package API, File read/write |
| Medium | Batch interface, SQL read/write |
| Complex | Calling Asynchronous Messaging, real time or protocol-driven hand shake interface, Web service, Storing data using complex DB scripts |

FIG. 4

| Control flow component | Analyze | | | Design | | | Build | | | Test | | |
|---|---|---|---|---|---|---|---|---|---|---|---|---|
| | Simple | Medium | Complex | Simple | Medium | Complex | Simple | Medium | Complex | Simple | Medium | Complex |
| ET | 0.3 | 0.5 | 1 | 0.3 | 0.5 | 1 | 1 | 2 | 3 | 1 | 2 | 3 |
| CFRV | 0.5 | 1 | 1.5 | 0.5 | 1 | 2 | 2 | 4 | 6 | 2 | 4 | 6 |
| EI/DO | 0.3 | 0.5 | 1 | 0.3 | 0.5 | 1 | 1 | 2 | 3 | 1 | 2 | 3 |

FIG. 6

CONTROL FLOW POINTS BASED SOFTWARE SIZE AND EFFORT ESTIMATION

FIELD

The present specification relates to size and effort estimation of software-based projects.

BACKGROUND

Accurately estimating the size and effort of a software-based project (e.g., computer-implemented programming language code) can be a challenging task, in particular at early stages of the project when information is abstract and limited. Use case point (UCP) estimation and FPA (Functional Point analyses) both lack the ability to address the inner complexity of business rules and validations in a functional flow, and do not consider the control flow and business rule validation complexity. Additionally, both UCP and FPA do not give the power to accurately estimate in early stages of project phase of functional requirements of the software project.

SUMMARY

Innovative aspects of the subject matter described in this specification may be embodied in methods that include the actions of identifying a software-based project including one or more functional requirements, the software-based project including computer-implemented programing language code; for each functional requirement, identifying one or more controls flows associated with the functional requirement, each control flow including one or more components; accessing one or more reference tables; determining, for each component of the one or more components, a complexity of the component based on a comparison with the one or more reference tables; and estimating an effort of the software-based project based on the complexity of each component of the one or more control flows associated with the one or more functional requirements.

Other embodiments of these aspects include corresponding systems, apparatus, and computer programs, configured to perform the actions of the methods, encoded on computer storage devices.

These and other embodiments may each optionally include one or more of the following features. For instance, the one or more components include an external trigger (ET) component, a control flow with rules and validations (CFRV) component, and an external integration/data operation (EI/DO) component. Identifying a type of one or more ET components of the one or more components; for each of the ET components, determining a complexity of the ET component based on a comparison of the identified type of the ET component and a respective reference table of the one or more reference tables; and for each of the ET components, determining the effort of the ET component based on the respective determined complexity. Identifying a type of one or more EI/DO components of the one or more components; for each of the EI/DO components, determining a complexity of the EI/DO component based on a comparison of the identified type of the EI/DO component and a respective reference table of the one or more reference tables; and for each of the EI/DO components, determining the effort of the EI/DO component based on the respective determined complexity. Identifying a quantity of rules and validations associated with each CFRV component of the one or more components, for each CFRV component, determining a complexity of the CFRV component based on a comparison of the identify quantity of rules and validation associated with the CFRV component and a respective reference table of the one or more reference tables; and for each CFRV component, determining the effort of the CFRV component based on the respective determined complexity.

The features further include, for example, determining, for each component of the one or more components, an analyze-design-build-test (ABDT) effort of the component. For each component, summing the effort of the component of each of the one or more control flows associated with the one or more functional requirements to provide a component summation; and summing each of the component summations to provide the effort. Estimating the size of the software-based project, the size of the software-based projected based on one or more of an estimated total project size of the software-based project in control flow points, an estimated total project effort of the software-based project in hours, an estimated total number of test cases of the software-based project, and an estimated total number of integration test cases of the software-based project.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

FIG. 4 illustrates reference tables for determining a complexity of the control flow components.

FIG. 6 illustrates an effort database for determining an effort of the control flow components.

DETAILED DESCRIPTION

Implementations of the present disclosure are generally directed to estimating the size and effort of a software-based project. More particularly, implementations of the present disclosure are directed to modeling functional requirements of a software-based project as control flows. The control flows include components, each associated with a complexity. Based on the complexity, an effort can be determined for the functional requirements, from which a size of the software-based project can be estimated.

Figure 1:
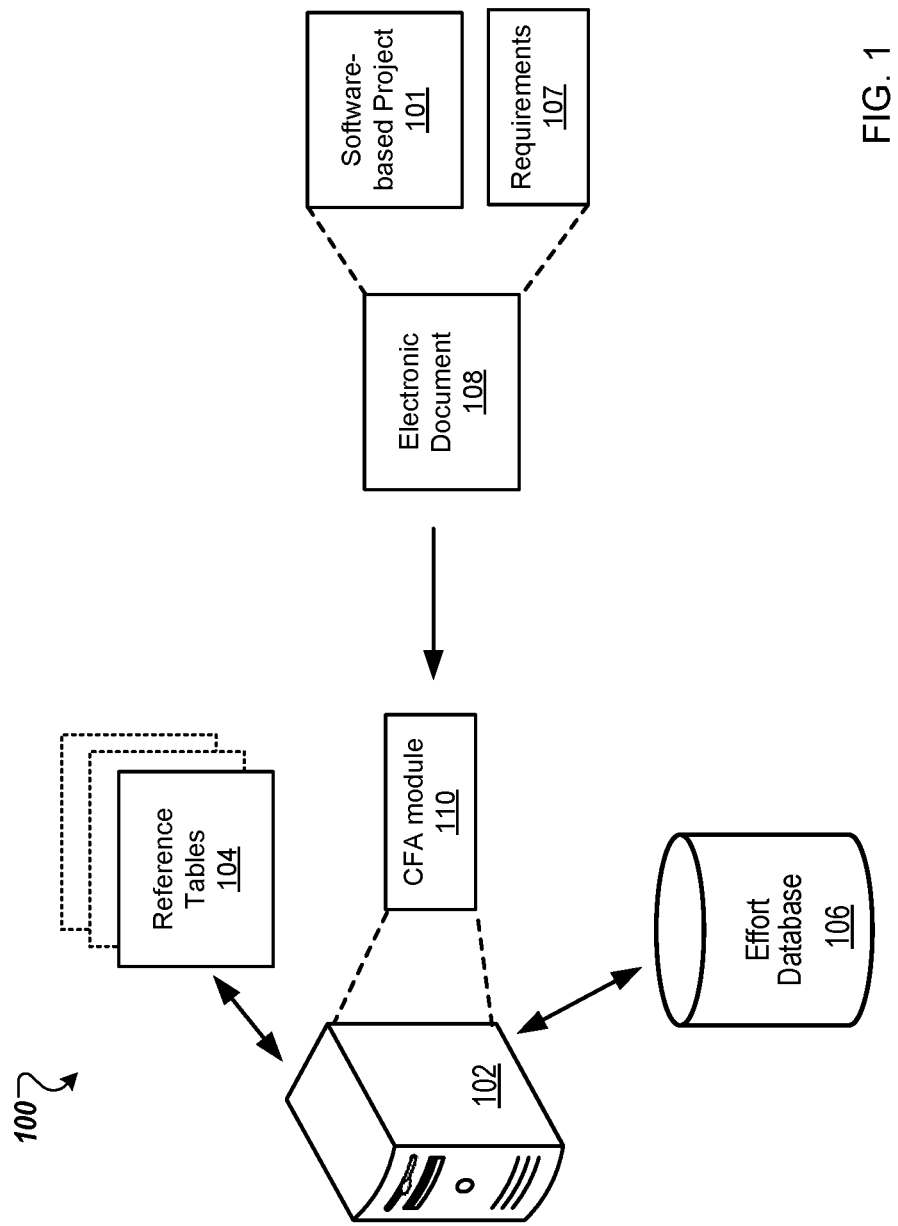
FIG. 1 illustrates a computing environment for estimating a size and effort of a software-based project.

FIG. 1 illustrates a computing environment 100 for estimating a size and effort of software-based project 101 that includes computer-implemented programming code. The computing environment 100 includes a computing system 102, reference tables 104, and an effort database 106. The computing system 102 includes a Control Flow Analyses (CFA) module 110.

In some implementations, the system 100, and specifically, the CFA module 110, receives an electronic document 108. The electronic document 108 includes a software-based project 101 and one or more functional requirements 107 associated with the software-based project 101. In some examples, the electronic document 108 provides a control flow points (CFP) modeling (or graphing) method. The CFP modeling method facilitates measurement of the software size based on a quantity of control flow components for the functional requirements 107 of the software-based project 101. In some examples, the control flow captures aspects of the functional requirements 107 of the software-based project 101, including rules and validations that facilitate determining a complexity of the functional requirements 107, explained further below. Specifically, the CFA module 110 models the functional requirements 107 of the software-based project 101 based on the CFP modeling of the electronic document 108. That is, for each functional requirement 107, the CFA module 110 identifies controls flows and components of the control flows. In some examples, the CFA module 110 models the components of the functional requirements 107 as external triggers (ET), control flows with rules and validations (CFRV), and external integration/data operation (EI/DO).

Figure 2:
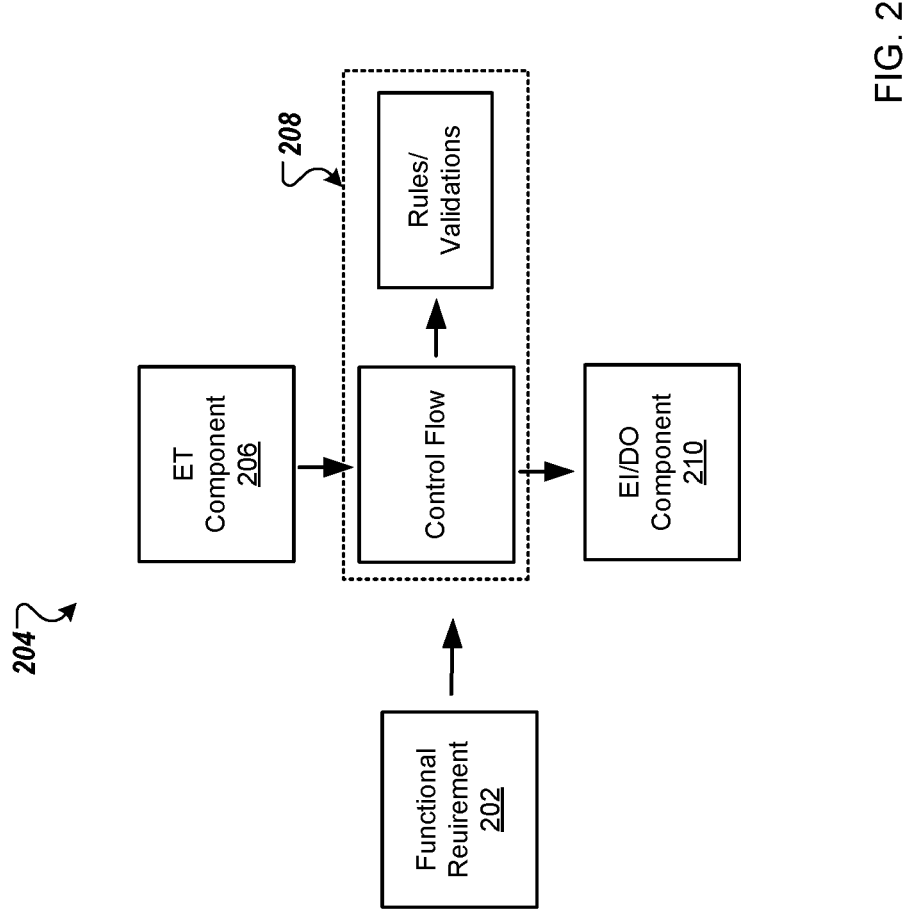
FIG. 2 illustrates a relationship between a functional requirement and control flow components of a control flow.

FIG. 2 illustrates a relationship between a functional requirement 202 (similar to functional requirements 107) and control flow components of a control flow 204. In the illustrated example, the control flow components include an external trigger (ET) component 206, a control flow with rules and validations (CFRV) component 208, and an external integration/data operation (EI/DO) component 210. In some examples, the ET component 206 is a starting point of the control flow 204 and the EI/DO component 210 is the ending point of the control flow. In some examples, the control flow 204 can include two or more starting points (i.e., two or more ET components). In some examples, the control flow 204 can include two or more ending points (i.e., two or more EI/DO components). In some examples, the ET component 206 can include a GUI, inbound API handler or batch program. In some examples, the CFRV component 208 can include execution flow with a business rules and validation check. In some examples, the EI/DO component 210 can include output APIs, web service calls, messages, or a batch interface. In some examples, the functional requirement 202 can include multiple control flows.

In summary, and as explained in further detail below, the computing system 102 determines a total effort associated with the functional requirement 202 and the control flow components 206, 208, 210. Specifically, the CFA module 110 can determine the complexity of the ET component 206 based on a comparison of the type (architecture/technology) of the ET component 206 with an appropriate reference table 104. The CFA module 110 can determine an analyze-design-build-test (ABDT) effort of the ET component 206 based on a comparison of the complexity of the ET component 206 with the effort database 106. Similarly, the CFA module 110 can determine the complexity of the EI/DO component 210 based on a comparison of the type (architecture/technology) of the EI/DO component with an appropriate reference table 104. The CFA module 110 can determine the ABDT effort of the EI/DO component 210 based on a comparison of the complexity of the EI/DO component 210 with the effort database 106. Additionally, the CFA module 110 determines the number of rules and validations of the CFRV component 208, and determines the complexity of the control flow based on a comparison of the number of rules and validations with an appropriate reference table 104. The CFA Module 110 can determine the ABDT effort of the CFRV component 208 based on the determined complexity of the CFRV component 208 with the effort database 106. The CFA module 110 can then determine the total effort based on a summation of the effort for each of the components 206, 208, 210. In some examples, the unit of measurement of the aforementioned effort is a control flow point.

Figure 10:
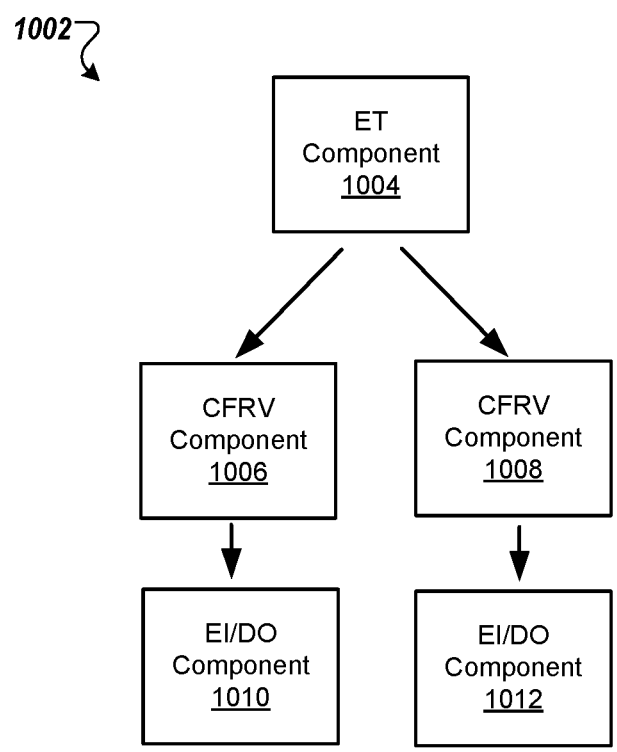
FIG. 10 illustrates an example modeling graph for a sample functional requirement.

FIG. 10 illustrates an electronic document (similar to the electronic document 108) including a modeling graph 1002 (e.g., CFP modeling). Specifically, the modeling graph 1002 includes an ET component 1004, CFRV components 1006, 1008, and EI/DO components 1010, 1012. In the illustrated example, the modeling graph 1002 includes five components, indicating a size of 5 control flow points (CFPs).

Figure 3:
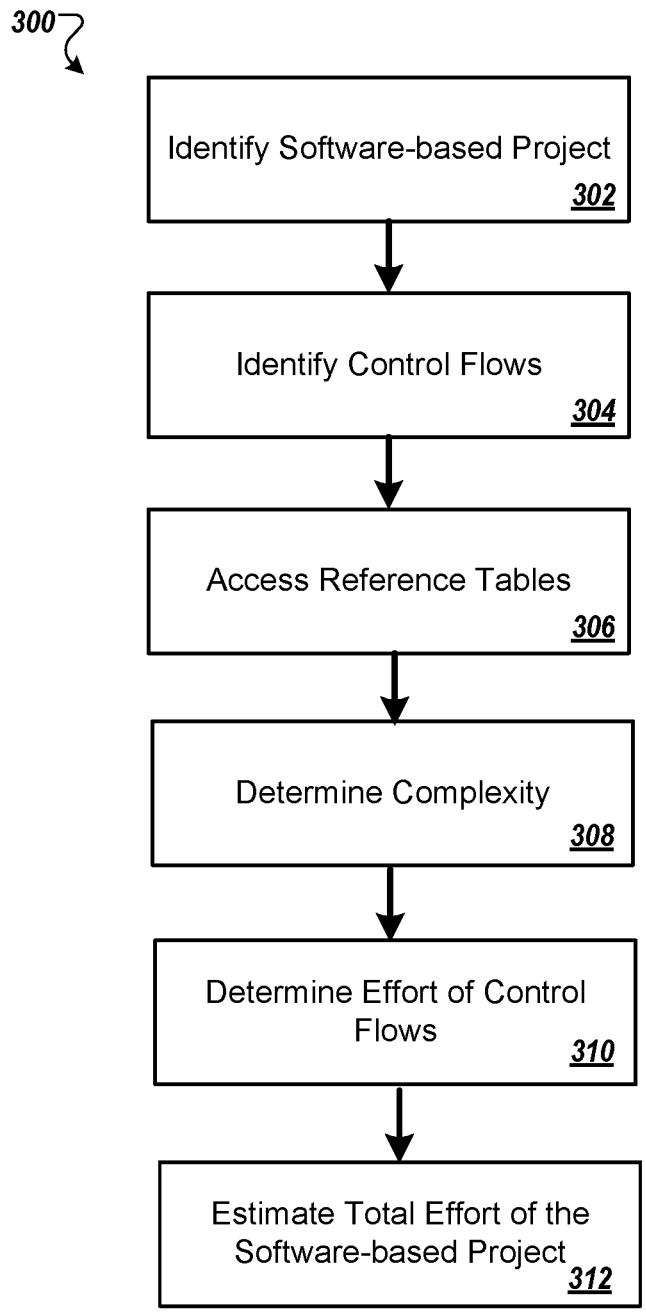
FIG. 3 illustrates a flowchart for estimating a size and effort of a software-based project.

FIG. 3 illustrates a flowchart for estimating a size and effort of a software-based project that includes computer-implemented programming language code. The example process 300 can be executed using one or more computing devices. For example, the computing system 102 and/or the CFA module 110 can be used to execute the example process 300.

At step 302, a software-based project including one or more functional requirements is identified. In some examples, the software-based project includes computer-implemented programming language code. Specifically, the computing system 102 identifies the software-based project 101 that includes the functional requirements 107. The computing system 102 can receive the software-based project 101 over one or more networks.

At step 304, for each functional requirement, one or more control flows associated with the functional requirement are identified. In some examples, each control flow includes one or more components. Specifically, the CFA module 110 analyzes each of the functional requirements to identify a number of control flows associated with each functional requirement. For example, for the functional requirement 202, the CFA module 110 analyzes the functional requirement 202 to identify the control flow 204 associated with the functional requirement 202. The control flow 204 includes one or more components. For example, the control flow 204 includes the ET component 206, the CFRV component 208, and the EI/DO component 210. However, the number of components, and the types of components, can vary depending on the specific implementation of the functional requirement.

At step 306, one or more references tables are accessed. Specifically, the CFA module 110 accesses the references tables 104 associated with the components of the control flow 204. FIG. 4 illustrates a particular implementation of the reference tables 104, shown as reference tables 402, 404, and 406. Reference tables 402, 404, 406 provide an association between a parameter of the respective component and a complexity of the component. In some examples, each of the complexities can include simple, medium, and high; however, the quantity of complexities and the type of complexities can vary based on the specific implementation. In the illustrated example, the reference table 402 is associated with the ET component 206, the reference table 404 is associated with the CFRV component 208, and the reference table 406 is associated with the EI/DO component 210.

At step 308, for each control flow of the control flows, a complexity is determined for each of the components based on a comparison with the reference tables. Specifically, the CFA module 110 determines a complexity for each of the components 206, 208, 210 of each control flow (e.g., control flow 204) that is associated with each functional requirement (e.g., functional requirement 202) of the software-based project based on a comparison with reference tables 402, 404, 406.

In some examples, the CFA module 110 determines the complexity of the ET component 206 based on a comparison with the reference table 402. Specifically, the CFA module 110 identifies a type of the ET component 206. Based on the identified type of the ET component 206 (e.g., architecture/technology of the ET component), the CFA module 110 determines a corresponding complexity (simple, medium, high) associated with the ET component 206. For example, a type of "program batch interface" for the ET component 206 is associated with a simple complexity for the ET component 206 based on the reference table 402.

In some examples, the CFA module 110 determines the complexity of the CFRV component 208 based on a comparison with the reference table 404. Specifically, the CFA module 110 identifies a number of rules and validations of the CFRV component 208. Based on the number of rules and validations of the CFRV component 208, the CFA module 110 determines a corresponding complexity (simple, medium, high) associated with the CFRV component 208. For example, four rules/validations for the CFRV component 208 is associated with a medium complexity for the CFRV component 208 based on the reference table 404.

Additionally, in some examples, the CFA module 110 determines the complexity of the EI/DO component 210 based on a comparison with the reference table 406. Specifically, the CFA module 110 identifies a type of the EI/DO component 210. Based on a type of the EI/DO component (e.g., architecture/technology of the EI/DO component), the CFA module 110 determines a corresponding complexity (simple, medium, high) associated with the EI/DO component 210. For example, a type of "batch interface" for the EI/DO component 210 is associated with a medium complexity for the EI/DO component 210 based on the reference table 406.

At step 310, for each control flow of the one or more control flows, an effort is determined for each of the components based on the complexity associated with the component. Specifically, the CFA module 110 determines the effort for each of the components 206, 208, 210 of each control flow that is associated with each functional requirement of the software-based project based on the complexity associated with each of the components 206, 208, 210. The CFA module 110 determines the effort of each of the components 206, 208, 210 based on data included by the effort database 106 and the determined complexity associated with each of the components 206, 208, 210. Specifically, the effort database 106 stores an effort value associated with each of the components 206, 208, 210 for each of the complexities.

The CFA module 110 determines the effort of the ET component 206 based on data included by the effort database 106 and the determined complexity associated with the ET component 206. That is, for the determined complexity associated with the ET component 206, the effort database 106 stores a corresponding effort value(s). The CFA module 110 accesses the effort database 106 and obtains the corresponding effort value(s) associated with the determined complexity of the ET component 206.

Further, the CFA module 110 determines the effort of the CFRV component 208 based on data included by the effort database 106 and the determined complexity associated with the CFRV component 208. That is, for the determined complexity associated with the CFRV component 208, the effort database 106 stores a corresponding effort value(s).

The CFA module 110 accesses the effort database 106 and obtains the corresponding effort value(s) associated with the determined complexity of the CFRB component 208.

Additionally, the CFA module 110 determines the effort of the EI/DO component 210 based on data included by the effort database 106 and the determined complexity associated with the EI/DO component 210. That is, for the determined complexity associated with the EI/DO component 210, the effort database 106 stores a corresponding effort value(s). The CFA module 110 accesses the effort database 106 and obtains the corresponding effort value(s) associated with the determined complexity of the EI/DO component 210.

In some examples, the effort of the components 206, 208, 210 is an ABDT effort of the respective component. That is, the CFA module 110 determines the ABDT effort of the ET component 206, the CFRV component 208, and the EI/DO component 210.

At step 312, an effort of the software-based project is estimated based on the complexity of each component of the control flows associated with the functional requirements. Specifically, the CFA module 110 estimates an effort of the software-based project 101 based on the complexity of each of the components 206, 208, 210 of each of the control flows associated with the functional requirements. In some examples, to estimate the effort of the software-based project 101, the CFA module 110 determines, for each functional requirement, a summation of the effort of each of the control flows. For example, the CFA module 110 can determine i) $\Sigma$ ET(complexity) effort, ii) $\Sigma$ CFRV(complexity) effort, and iii) $\Sigma$ EI/DO(complexity) effort.

Furthermore, to estimate the total effort of the software-based project 101, the CFA module 110 determines a summation of each of the component summations to provide a total effort. For example, the CFA module can determine the total effort as $\Sigma$ ET(complexity) effort+$\Sigma$ CFRV(complexity) effort+$\Sigma$ EI/DO(complexity) effort.

In some implementations, the CFA module 110 estimates the size of the software-based project 101 based on the total effort. In some examples, the size of the software-based project 101 can refer to one or more i) an estimated total project size of the software-based project 101 in control flow points, ii) an estimated total project effort of the software-based project 101 in work-hours, iii) an estimated total number of test cases of the software-based project 101, and iv) an estimated total number of integration test cases of the software-based project 101.

Figure 5:
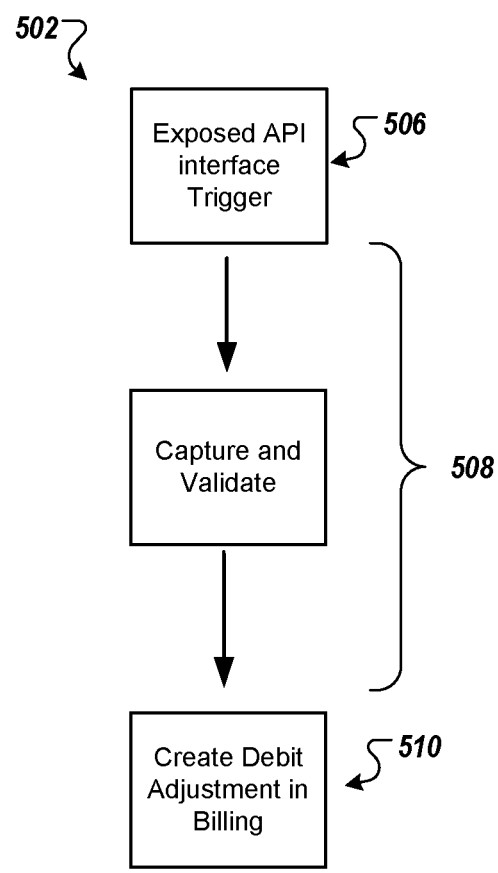
FIGS. 5, 7, 8 illustrate examples of determining an effort of functional requirements.

FIG. 5 illustrates an example of determining an effort of a first functional requirement 502. Specifically, in the illustrated example, the functional requirement 502 (of a software-based project) is associated with supporting debit adjustments of a billing system. The functional requirement 502 is illustrated as a CFA graph including an ET component 506, a CFRV component 508, and an EI/DO component 510. The ET component 506 is an "Exposed API interface trigger" that is associated with a type ("program batch interface") that is of simple complexity based on the reference table 402. The CFRV component 508 is associated with one validation and based on reference table 404, is of simple complexity. The EI/DO component 510 is a "Create debit adjustment in Billing System database" that is associated with a type ("SQL read/write") that is of simple complexity based on the reference table 406. In some examples, the functional requirement 502 is associated with a single test case with one test condition. In the illustrated example, the test conditions can include test conditions for the successful creation of a validated debit adjustment.

FIG. 6 illustrates an example effort database 602. Specifically, the effort of each of the components 506, 508, and 510 is determined based on the associated complexities, and the effort database 602. In some examples, the effort database 602 is based on the effort in term of work-days (e.g., work-days to produce a corresponding software-based project, or a portion of the corresponding software-based project). In some examples, the effort database 602 can include values independent of the specific software-based project, or based on the specific software-based project. In some examples, the effort database 602 can include values that are static, or dynamic. In the illustrated example, based on the simple complexity of the ET component 506 and the effort database 602, the effort of the ET component 506 is determined as Σ ET(simple) effort=0.3+0.3+1+1=2.6 work days. For the CFRV component 508, the effort is determined as Σ CFRV(simple) effort=0.5+0.5+2+2=5 work days. For the EI/DO component 510, the effort is determined as Σ EI/DO (simple) effort=0.3+0.3+1+1=2.6 work days. The total effort is based on a summation of the efforts of each of the components 506, 508, 510. That is, the total effort is determined as Σ ET(simple) effort+Σ CFRV(simple) effort+Σ EI/DO(simple) effort, or 2.6 work days+5 works days+2.6 works days=10.2 work days.

Figure 7:
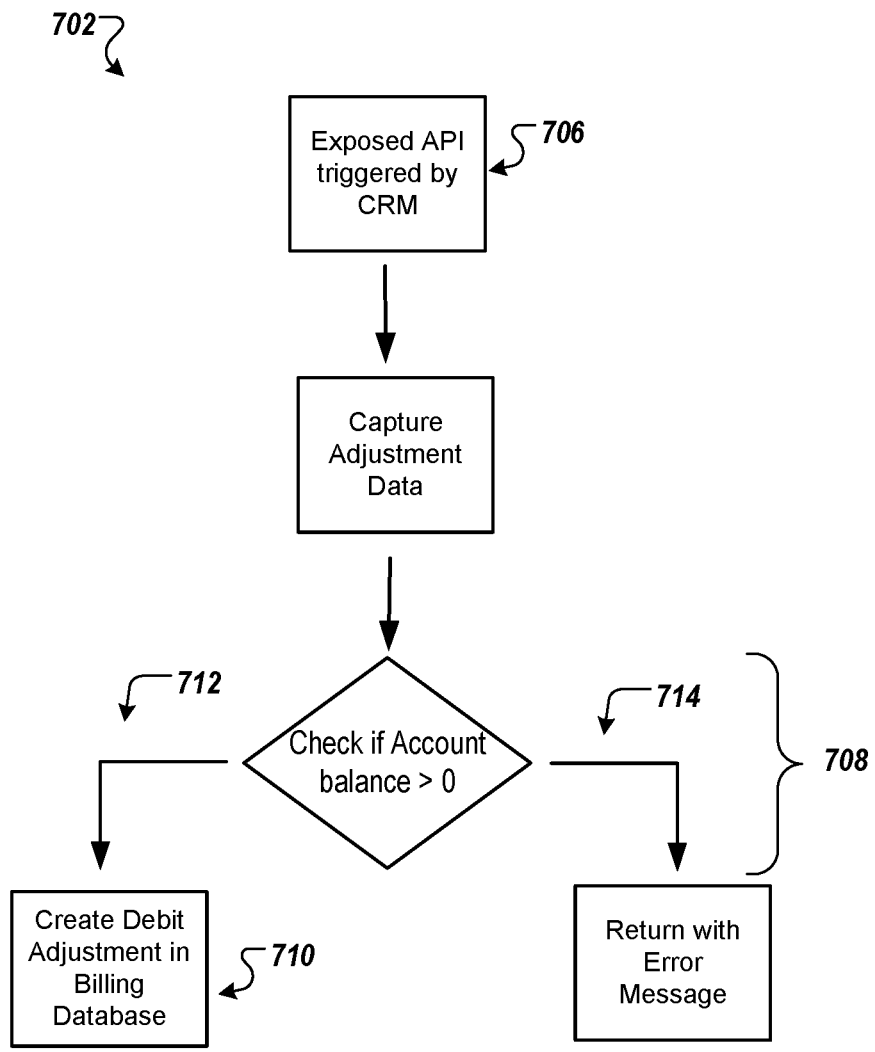

FIG. 7 illustrates an example of determining an effort of a second functional requirement 702. Specifically, in the illustrated example, the functional requirement 702 (of a software-based project) is associated with crediting debit adjustments of the billing system. The functional requirement 702 is illustrated as a CFA graph including an ET component 706, a CFRV component 708, an EI/DO component 710, and control flows 712, 714. The ET component 706 is an "Exposed API interface triggered by CRM" that is associated with a type ("program batch interface") that is of simple complexity based on the reference table 402. The CFRV component 708 is associated with one validation and based on reference table 404, is of simple complexity. The EI/DO component 710 includes "Create debit adjustment in Billing System database" that is associated with a type ("SQL read/write") that is of simple complexity based on the reference table 406. In some examples, the functional requirement 702 is associated with two test cases with one test condition each. In the illustrated example, the test conditions can include test conditions for successful creation of a validated debit adjustment creation when account the balance is greater than zero, and an error message response when the account balance is less than zero.

Referring to FIG. 6, the effort of each of the components 706, 708, and 710 is determined based on the associated complexities, and the effort database 602. In the illustrated example, based on the simple complexity of the ET component 706 and the effort database 602, the effort of the ET component 706 is determined as Σ ET(simple) effort=0.3+0.3+1+1=2.6 work days. For the CFRV component 708, the effort is, for each of the control flows 712, 714, determined as Σ CFRV(simple) effort=0.5+0.5+2+2=5 work days. For the EI/DO component 710, the effort is determined as Σ EI/DO(simple) effort=0.3+0.3+1+1=2.6 work days. The total effort is based on a summation of the efforts of each of the components 706, 710 and for each control flow 712, 714 associated with the CFRV component 708. That is, the total effort is determined as Σ ET(simple) effort+Σ CFRV(simple) effort+Σ CFRV(simple) effort+Σ EI/DO(simple) effort, or 2.6 work days+5 works days+5 work days+2.6 works days=15.2 work days.

Figure 8:
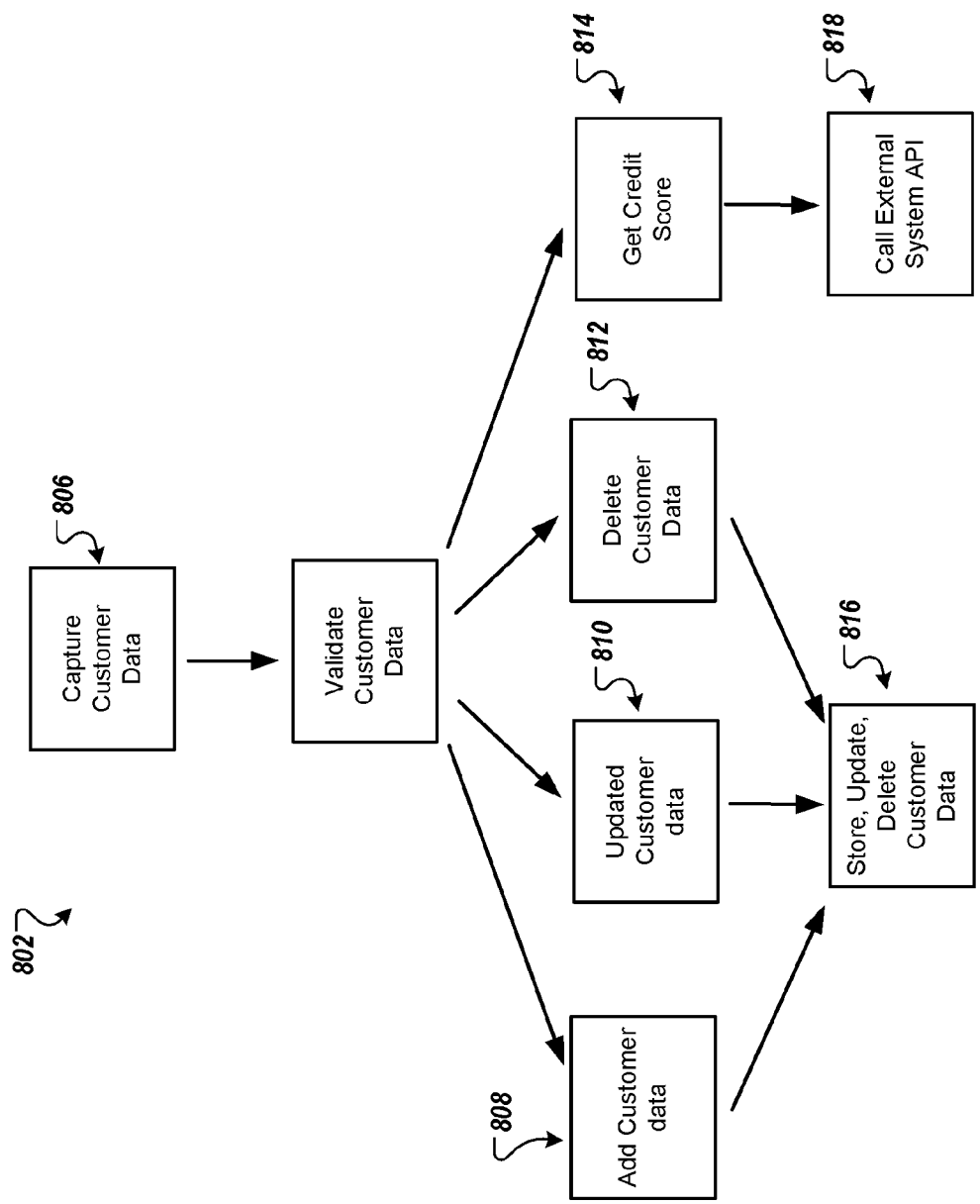

FIG. 8 illustrates an example of determining an effort of a third set of functional requirements 802. Specifically, the set of functional requirements 802 (of a software-based project is associated with a set of functional requirements including i) capturing customer code and name, ii) validating customer details and obtained customer credit score, and iii) GUI functionality. The set of functional requirements 802 is illustrated as a CFA graph including an ET component 806, CFRV components 808, 810, 812, 814, and EI/DO components 816, 818. The ET component 806 is a "Capture customer data" that is associated with a type ("GUI interface") that is of complex complexity based on the reference table 402. Each of the CFRV components 808, 810, 812, 814 is associated with one validation and based on the reference table 404, are of simple complexity. The EI/DO component 816 includes three types of database calls (store, updated, delete) that are each associated with a type ("SQL read/write") that is of medium complexity based on the reference table 406. Additionally, the EI/DO component 818 is a "call external system API" that is associated with a type ("batch interface") that is of medium complexity based on the reference table 406. In some examples, the set of functional requirements 802 is associated with four test cases with one test condition each. In the illustrated example, the test conditions can include test conditions for external credit score check, addition of a customer, deletion of a customer, and customer modification.

Referring to FIG. 6, the effort of each of the components 806, 808, 810, 812, 814, 816, 818 is determined based on the associated complexities, and the effort database 602. In the illustrated example, based on the simple complexity of the ET component 806 and the effort database 602, the effort of the ET component 806 is determined as Σ ET(complex) effort=1+1+3+3=8 work days. For each of the CFRV components 808, 810, 812, 814, the effort is determined as Σ CFRV(simple) effort=0.5+0.5+2+2=5 work days. For each of the types of database calls of the EI/DO components 816, the effort is determined as Σ EI/DO(medium) effort=0.5+0.5+2+2=5 work days. For the EI/DO component 818, the effort is determined as Σ EI/DO(medium) effort=0.5+0.5+2+2=5 work days. The total effort is based on a summation of the efforts of each of the components 806, 808, 810, 812, 814, 818, and for each type of database call associated with the EI/DO component 816. That is, the total effort is determined Σ ET(simple) effort+4×Σ CFRV(simple) effort+3×Σ EI/DO(simple) effort+Σ EI/DO(simple) effort, or 8 work days+4×(5 work days)+3×5 work days+5 work days=48 work days.

Figure 9:
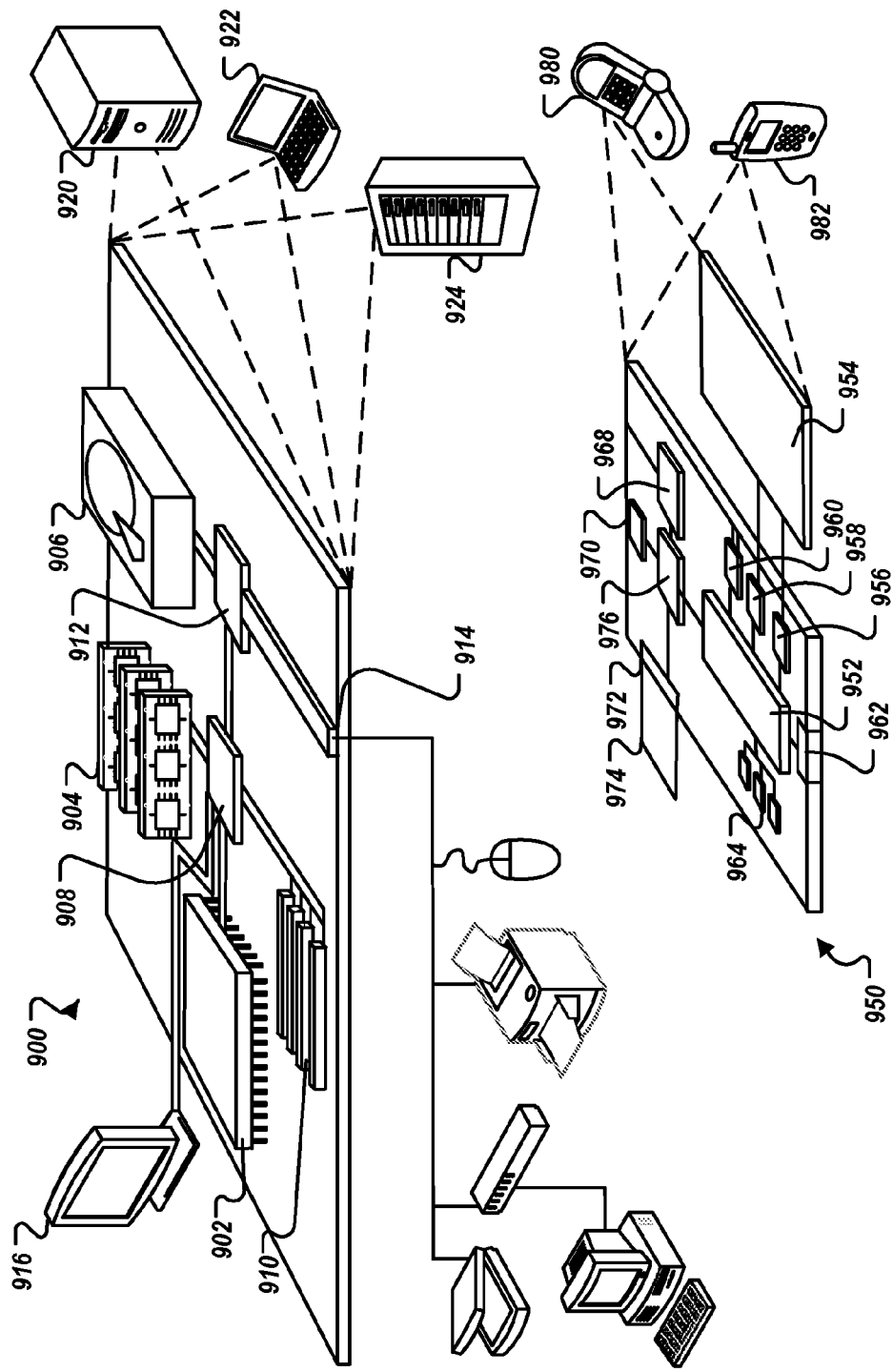
FIG. 9 depicts a computer device and a mobile computer device that may be used to implement the techniques described herein.

FIG. 9 shows an example of a generic computer device 900 and a generic mobile computer device 940, which may be used with the techniques described here. Computing device 900 is intended to represent various forms of digital computers, such as laptops, desktops, workstations, personal digital assistants, servers, blade servers, mainframes, and other appropriate computers. Computing device 940 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 may process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 904, the storage device 906, or a memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter. In some examples, the storage device 906 is coupled to a high-speed bus.

The computing device 900 may be implemented in a number of different forms, as shown in the figure. For example, it may be implemented as a standard server 920, or multiple times in a group of such servers. It may also be implemented as part of a rack server system 424. In addition, it may be implemented in a personal computer such as a laptop computer 922. Alternatively, components from computing device 900 may be combined with other components in a mobile device (not shown), such as device 940. Each of such devices may contain one or more of computing device 900, 940, and an entire system may be made up of multiple computing devices 900, 940 communicating with each other.

Computing device 940 includes a processor 952, memory 964, an input/output device such as a display 954, a communication interface 976, and a transceiver 968, among other components. The device 940 may also be provided with a storage device, such as a microdrive or other device, to provide additional storage. Each of the components 940, 952, 964, 954, 976, and 968, are interconnected using various buses, and several of the components may be mounted on a common motherboard or in other manners as appropriate.

The processor 952 may execute instructions within the computing device 940, including instructions stored in the memory 964. The processor may be implemented as a chipset of chips that include separate and multiple analog and digital processors. The processor may provide, for example, for coordination of the other components of the device 940, such as control of user interfaces, applications run by device 940, and wireless communication by device 940.

Processor 952 may communicate with a user through control interface 968 and display interface 946 coupled to a display 954. The display 954 may be, for example, a TFT LCD (Thin-Film-Transistor Liquid Crystal Display) or an OLED (Organic Light Emitting Diode) display, or other appropriate display technology. The display interface 946 may comprise appropriate circuitry for driving the display 954 to present graphical and other information to a user. The control interface 948 may receive commands from a user and convert them for submission to the processor 952. In addition, an external interface 962 may be provide in communication with processor 952, so as to enable near area communication of device 940 with other devices. External interface 962 may provide, for example, for wired communication in some implementations, or for wireless communication in other implementations, and multiple interfaces may also be used.

The memory 964 stores information within the computing device 940. The memory 964 may be implemented as one or more of a computer-readable medium or media, a volatile memory unit or units, or a non-volatile memory unit or units. Expansion memory 944 may also be provided and connected to device 940 through expansion interface 942, which may include, for example, a SIMM (Single In Line Memory Module) card interface. Such expansion memory 944 may provide extra storage space for device 940, or may also store applications or other information for device 940. Specifically, expansion memory 944 may include instructions to carry out or supplement the processes described above, and may include secure information also. Thus, for example, expansion memory 944 may be provide as a security module for device 940, and may be programmed with instructions that permit secure use of device 940. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 944, memory on processor 952, or a propagated signal that may be received, for example, over transceiver 968 or external interface 962.

Device 940 may communicate wirelessly through communication interface 976, which may include digital signal processing circuitry where necessary. Communication interface 976 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 940 may provide additional navigation- and location-related wireless data to device 940, which may be used as appropriate by applications running on device 940.

Device 940 may also communicate audibly using audio codec 960, which may receive spoken information from a user and convert it to usable digital information. Audio codec 960 may likewise generate audible sound for a user, such as through a speaker, e.g., in a handset of device 940. Such sound may include sound from voice telephone calls, may include recorded sound (e.g., voice messages, music files, etc.) and may also include sound generated by applications operating on device 940.

The computing device 940 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method, comprising:
   identifying a software-based project including one or more functional requirements, the software-based project including computer-implemented programing language code;
   for each functional requirement, identifying one or more controls flows associated with the functional requirement, each control flow including one or more components;

accessing one or more first reference tables that indicate, for a value of a parameter of a respective component of the one or more components, a complexity of the respective component;

determining, for each component of the one or more components, the complexity of the component based on a comparison with the one or more first reference tables;

accessing a second reference table that indicates, for the complexity of a respective component of the one or more components, an analyze value, a design value, a build value, and a test value of the respective component;

based on the second reference table, determining, for each component of the one or more components, the analyze value, the design value, the build value, and the test value of the respective component;

determining, for each component of the one or more components, an analyze-design-build-test (ADBT) effort of the component based on respective analyze, design, build, and test values; and estimating a total effort of the software-based project based on the ADBT effort of each component of the one or more control flows associated with the one or more functional requirements to provide a component summation.

2. The computer-implemented method of claim 1, wherein the one or more components include an external trigger (ET) component, a control flow with rules and validations (CFRV) component, and an external integration/data operation (EI/DO) component.

3. The computer-implemented method of claim 2, the method further comprising:
identifying a type of one or more ET components of the one or more components;
for each of the ET components, determining a complexity of the ET component based on a comparison of the identified type of the ET component and a respective first reference table of the one or more first reference tables; and
for each of the ET components, determining the effort of the ET component based on the respective determined complexity.

4. The computer-implemented method of claim 2, the method further comprising:
identifying a type of one or more EI/DO components of the one or more components;
for each of the EI/DO components, determining a complexity of the EI/DO component based on a comparison of the identified type of the EI/DO component and a respective first reference table of the one or more first reference tables; and
for each of the EI/DO components, determining the effort of the EI/DO component based on the respective determined complexity.

5. The computer-implemented method of claim 2, the method further comprising:
identifying a quantity of rules and validations associated with each CFRV component of the one or more components,
for each CFRV component, determining a complexity of the CFRV component based on a comparison of the identify quantity of rules and validation associated with the CFRV component and a respective first reference table of the one or more first reference tables; and
for each CFRV component, determining the effort of the CFRV component based on the respective determined complexity.

6. The computer-implemented method of claim 1, wherein estimating the effort of the software-based project further comprises:
for each component, summing the effort of the component of each of the one or more control flows associated with the one or more functional requirements to provide the component summation; and
summing each of the component summations to provide the effort.

7. The computer-implemented method of claim 1, further comprising estimating the size of the software-based project, the size of the software-based projected based on one or more of an estimated total project size of the software-based project in control flow points, an estimated total project effort of the software-based project in hours, an estimated total number of test cases of the software-based project, and an estimated total number of integration test cases of the software-based project.

8. A system comprising:
one or more computers and one or more storage devices storing instructions that are operable, when executed by the one or more computers, to cause the one or more computers to perform operations comprising:
identifying a software-based project including one or more functional requirements, the software-based project including computer-implemented programing language code;
for each functional requirement, identifying one or more controls flows associated with the functional requirement, each control flow including one or more components;
accessing one or more first reference tables that indicate, for a value of a parameter of a respective component of the one or more components, a complexity of the respective component;
determining, for each component of the one or more components, the complexity of the component based on a comparison with the one or more first reference tables;
accessing a second reference table that indicates, for the complexity of a respective component of the one or more components, an analyze value, a design value, a build value, and a test value of the respective component;
based on the second reference table, determining, for each component of the one or more components, the analyze value, the design value, the build value, and the test value of the respective component;
determining, for each component of the one or more components, an analyze-design-build-test (ADBT) effort of the component based on respective analyze, design, build, and test values; and
estimating a total effort of the software-based project based on the ADBT effort of each component of the one or more control flows associated with the one or more functional requirements to provide a component summation.

9. The system of claim 8, wherein the one or more components include an external trigger (ET) component, a control flow with rules and validations (CFRV) component, and an external integration/data operation (EI/DO) component.

10. The system of claim 9, the operations further comprising:
identifying a type of one or more ET components of the one or more components;
for each of the ET components, determining a complexity of the ET component based on a comparison of the identified type of the ET component and a respective first reference table of the one or more first reference tables; and for each of the ET components, determining the effort of the ET component based on the respective determined complexity.

11. The system of claim 9, the operations further comprising:

identifying a type of one or more EI/DO components of the one or more components;

for each of the EI/DO components, determining a complexity of the EI/DO component based on a comparison of the identified type of the EI/DO component and a respective first reference table of the one or more first reference tables; and for each of the EI/DO components, determining the effort of the EI/DO component based on the respective determined complexity.

12. The system of claim 9, the operations further comprising:

identifying a quantity of rules and validations associated with each CFRV component of the one or more components, for each CFRV component, determining a complexity of the CFRV component based on a comparison of the identify quantity of rules and validation associated with the CFRV component and a respective first reference table of the one or more first reference tables; and for each CFRV component, determining the effort of the CFRV component based on the respective determined complexity.

13. The system of claim 8, wherein estimating the effort of the software-based project further comprises:

for each component, summing the effort of the component of each of the one or more control flows associated with the one or more functional requirements to provide the component summation; and summing each of the component summations to provide the effort.

14. The system of claim 8, the operations further comprising estimating the size of the software-based project, the size of the software-based projected based on one or more of an estimated total project size of the software-based project in control flow points, an estimated total project effort of the software-based project in hours, an estimated total number of test cases of the software-based project, and an estimated total number of integration test cases of the software-based project.

15. A non-transitory computer-readable medium storing software comprising instructions executable by one or more computers which, upon such execution, cause the one or more computers to perform operations comprising:

identifying a software-based project including one or more functional requirements, the software-based project including computer-implemented programing language code;

for each functional requirement, identifying one or more controls flows associated with the functional requirement, each control flow including one or more components;

accessing one or more first reference tables that indicate, for a value of a parameter of a respective component of the one or more components, a complexity of the respective component;

determining, for each component of the one or more components, the complexity of the component based on a comparison with the one or more first reference tables;

accessing a second reference table that indicates, for the complexity of a respective component of the one or more components, an analyze value, a design value, a build value, and a test value of the respective component;

based on the second reference table, determining, for each component of the one or more components, the analyze value, the design value, the build value, and the test value of the respective component;

determining, for each component of the one or more components, an analyze-design-build-test (ADBT) effort of the component based on respective analyze, design, build, and test values; and estimating a total effort of the software-based project based on the ADBT effort of each component of the one or more control flows associated with the one or more functional requirements to provide a component summation.

16. The computer-readable medium of claim 15, wherein the one or more components include an external trigger (ET) component, a control flow with rules and validations (CFRV) component, and an external integration/data operation (EI/DO) component.

17. The computer-readable medium of claim 16, the operations further comprising:

identifying a type of one or more ET components of the one or more components;

for each of the ET components, determining a complexity of the ET component based on a comparison of the identified type of the ET component and a respective first reference table of the one or more first reference tables; and for each of the ET components, determining the effort of the ET component based on the respective determined complexity.

18. The computer-readable medium of claim 16, the operations further comprising:

identifying a type of one or more EI/DO components of the one or more components;

for each of the EI/DO components, determining a complexity of the EI/DO component based on a comparison of the identified type of the EI/DO component and a respective first reference table of the one or more first reference tables; and for each of the EI/DO components, determining the effort of the EI/DO component based on the respective determined complexity.

19. The computer-readable medium of claim 16, the operations further comprising:

identifying a quantity of rules and validations associated with each CFRV component of the one or more components, for each CFRV component, determining a complexity of the CFRV component based on a comparison of the identify quantity of rules and validation associated with the CFRV component and a respective first reference table of the one or more first reference tables; and for each CFRV component, determining the effort of the CFRV component based on the respective determined complexity.

* * * * *